(12) United States Patent
Gore

(10) Patent No.: US 6,855,443 B2
(45) Date of Patent: Feb. 15, 2005

(54) ELECTROCHEMICAL DEVICE

(75) Inventor: Makarand P. Gore, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 437 days.

(21) Appl. No.: 10/120,864

(22) Filed: Apr. 10, 2002

(65) Prior Publication Data
US 2003/0194585 A1 Oct. 16, 2003

(51) Int. Cl.[7] .................................. H01M 8/18
(52) U.S. Cl. .................... 429/19; 429/27; 429/30; 429/33; 429/40; 429/41; 429/44; 429/90; 429/91; 429/92; 429/101; 429/105; 204/400; 204/416; 204/252; 204/263; 205/637
(58) Field of Search ................. 429/90, 91, 92, 429/101, 105, 15, 19, 27, 30, 33, 40, 41, 44; 204/263, 252, 400, 416; 205/637

(56) References Cited

U.S. PATENT DOCUMENTS

| 4,397,925 | A | 8/1983 | Magahed |
| 5,804,329 | A | 9/1998 | Amendola |
| 6,074,771 | A | 6/2000 | Cubukcu et al. |
| 6,306,285 | B1 | 10/2001 | Narayanan et al. |
| 6,307,605 | B1 | 10/2001 | Bailey |
| 6,544,400 | B2 * | 4/2003 | Hockaday et al. .......... 205/338 |
| 6,683,025 | B2 * | 1/2004 | Amendola et al. .......... 502/439 |

OTHER PUBLICATIONS

Mirkin et al., "Borohydride Oxidation at a Gold Electrode," J. Electrochem. Soc., vol. 139, No. 8, 1992.

* cited by examiner

Primary Examiner—Bruce F. Bell

(57) ABSTRACT

A device in accordance with a present invention includes at least one of a stainless steel anode and transition metal oxide cathode.

56 Claims, 8 Drawing Sheets

ELECTROCHEMICAL DEVICE

BACKGROUND OF THE INVENTIONS

1. Field of the Inventions

The present inventions are related to electrochemical devices such as, for example, fuel cells and batteries.

2. Description of the Related Art

Electrochemical cells, such as fuel cells and batteries, convert fuel (such as borohydride fuel) and oxidant into electricity and reaction product(s). The primary difference between fuel cells and batteries is simply that all of the fuel that will be consumed by a battery is initially present in the battery, whereas fuel cells have a replenishable fuel supply. Electrochemical cells are advantageous because they possess relatively high energy density and are not hampered by lengthy recharging cycles, as are rechargeable (or "secondary") batteries. Electrochemical cells are also relatively small, lightweight and produce virtually no environmental emissions. Nevertheless, the inventor herein has determined that conventional electrochemical cells are susceptible to improvement. More specifically, the inventor herein has determined that it would be advantageous to increase the power density and cost effectiveness of electrochemical cells.

BRIEF DESCRIPTION OF THE DRAWINGS

Detailed description of preferred embodiments of the inventions will be made with reference to the accompanying drawings.

DETAILED DESCRIPTION OF THE PREFERRED EMBODIMENTS

The following is a detailed description of the best presently known modes of carrying out the inventions. This description is not to be taken in a limiting sense, but is made merely for the purpose of illustrating the general principles of the inventions. It is noted that detailed discussions of electrochemical cell structures that are not pertinent to the present inventions have been omitted for the sake of simplicity.

Figure 1:
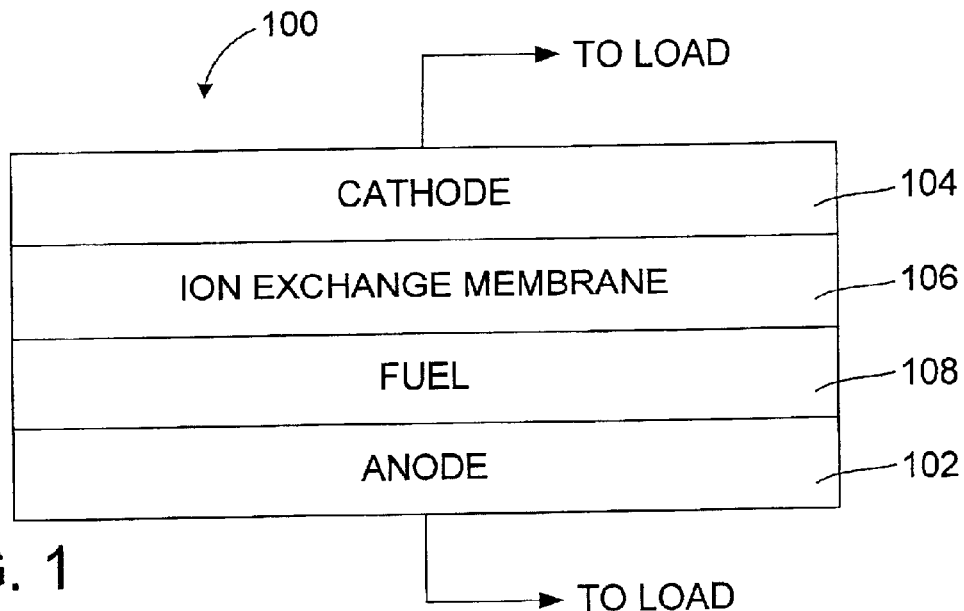
FIG. 1 is a diagrammatic view of an electrochemical cell in accordance with a preferred embodiment of a present invention.
Figure 7:
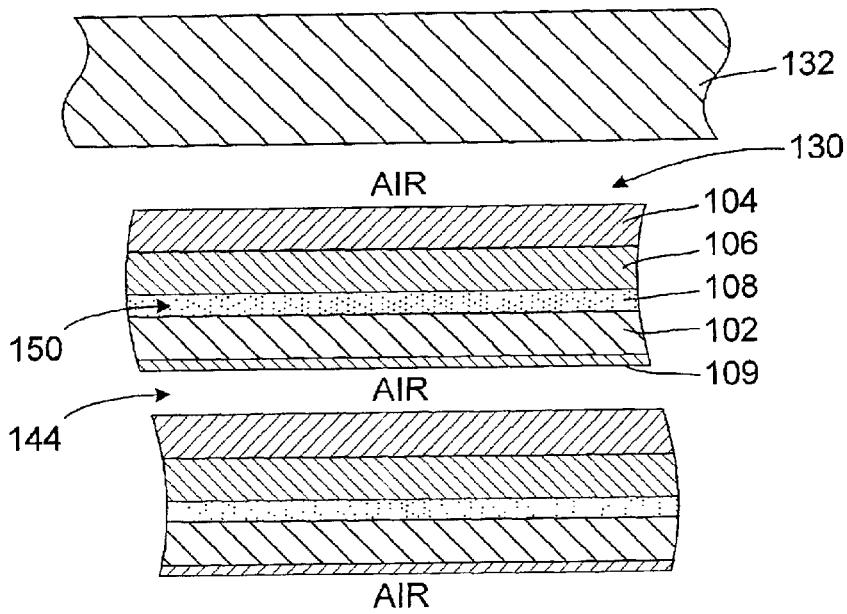
FIG. 7 is an enlarged section view of a portion of the battery illustrated in FIGS. 5 and 6.

As illustrated for example in FIG. 1, an electrochemical cell 100 in accordance with one embodiment of a present invention includes an anode 102 (or "fuel electrode") and a cathode 104 (or "air electrode"). An optional ion exchange membrane 106, which is secured to the cathode 104 in the exemplary embodiment, may be provided in those instances where a soluble fuel is used. Fuel 108 is consumed at the anode 102. Oxygen, which is preferably drawn from ambient air, is consumed at the cathode 104. The anode 102 is protected from the air by an air impermeable membrane 109 (FIG. 7). The fuel 108 is located with a relatively thin space (i.e. about 0.5 mm to about 5 mm) between the anode 102 and the ion exchange membrane 106. As discussed in greater detail below, the manner in which the fuel 108 is situated adjacent to the anode 102 will depend on the style (i.e. a battery or fuel cell) and particulars of the electrochemical cell. For example, a space for additional fuel may be provided between the anode 102 and the air impermeable membrane 109.

The fuel 108 is preferably a borohydride fuel such as, for example, sodium borohydride ($NaBH_4$) in a 20% sodium hydroxide (NaOH) solution. Here, when the electrochemical cell 100 is connected to a load, the reaction at the anode 102 will be $BH_4 + 8\ OH^- \rightarrow BO_2^- + 6H_2O + 8\ e^-$ -(2), while the reaction at the cathode 104 will be $8\ e^- + 4\ H_2O + 2\ O_2 \rightarrow 8\ OH^-$ — (3).

Figure 2:
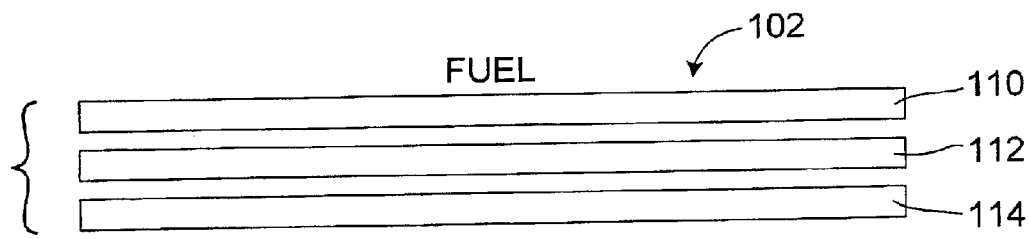
FIG. 2 is an exploded view of an anode in accordance with a preferred embodiment of a present invention.

The exemplary anode 102 is preferably a stainless steel anode. As illustrated for example in FIG. 2, the exemplary anode 102 may be a membrane electrode assembly ("MEA") that consists of a support layer 110, a catalyst layer 112 and a stainless steel collector 114. In a borohydride-fueled electrochemical cell, a suitable support layer material is Teflon and a suitable catalyst is an alloy or a transition metal. The stainless steel collector 114 is preferably a porous structure such as a porous stainless steel plate, a mesh (such as a 10 micron mesh) formed from stainless steel microfibers, or a stainless steel composite. A suitable stainless steel is 316 stainless steel.

Stainless steel is preferred because it does not catalyze borohydride to hydrogen conversion, but does catalyze the electrolytic reaction at the anode 102. Thus, in the preferred implementation, the stainless steel anode 102 is in physical contact with the fuel 108 and is not coated with a catalyzing metal or any other surface coating. It should be noted that other metals that do not generate significant amounts of hydrogen, but do catalyze the electrolytic reaction may also be used for the anode 102.

Figure 3:
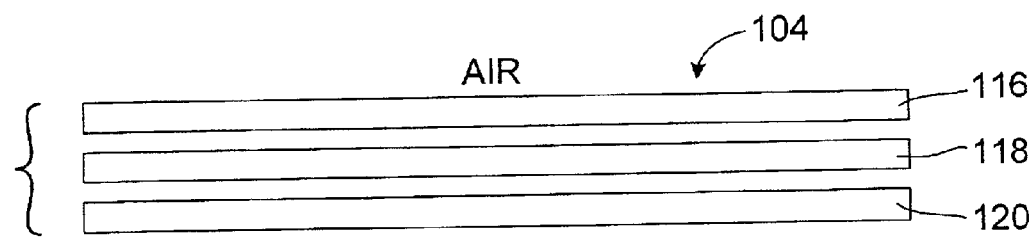
FIG. 3 is an exploded view of a cathode in accordance with a preferred embodiment of a present invention.

The exemplary cathode 104 is preferably a transition metal oxide cathode. Transition metal oxides are more cost-effective than pure transition metals (such as pure precious metals). Transition metal oxides also participate in the reaction at the cathode, while pure transition metals do not. As illustrated for example in FIG. 3, the exemplary cathode 104 is also in the form of an MEA. More specifically, the exemplary cathode 104 consists of an air permeable, liquid impermeable membrane layer 116, a catalyst layer 118 formed from a transition metal (i.e. scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium or ununbium) oxide and a collector 120 formed from a metal mesh such as stainless steel, copper or gold plated nickel mesh. In a borohydride-fueled electrochemical cell, a suitable transition metal oxide MEA for the cathode is the AC65 silver MEA from Alupower, Inc. in Pawcatuck, Conn. Platinum oxide and gold oxide are also preferred cathode materials.

The inventor herein has determined that the combination of a stainless steel anode and a transition metal oxide cathode in a borohydride-fueled electrochemical cell provides power densities greater than 300 Watt-hours per kilogram of borohydride fuel ("Wh/kg"). Exemplary power densities include 450 Wh/kg, 600 Wh/kg, 1000 Wh/kg and 2000 Wh/kg, depending on the configuration of the cell. The inventor herein has also determined that the combination of a stainless steel anode and a transition metal oxide cathode in a borohydride-fueled electrochemical cell provides open cell voltages of 0.88 V and 5.76 mw of power at 10 ohms of resistance. The inventor herein has also determined that the combination of a stainless steel anode and a transition metal oxide cathode in a borohydride-fueled electrochemical cell is more cost effective than conventional borohydride-fueled electrochemical cells.

Figure 4:
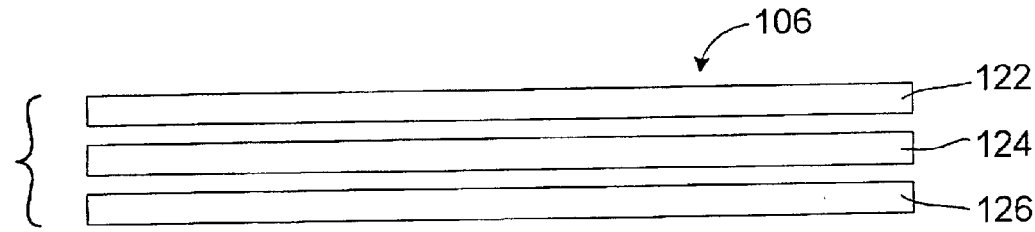
FIG. 4 is an exploded view of an ion exchange membrane in accordance with a preferred embodiment of a present invention.

One example of the optional ion exchange membrane 106 is illustrated in FIG. 4. The exemplary ion exchange membrane includes a support layer 122, such as a metal or plastic mesh, an electrolyte 124 and a membrane 126. Although the present inventions are not limited to use with any particular ion exchange membrane, suitable ion exchange membranes for use in electrochemical cells that consume borohydride fuel include the Selemion™ ion exchange membrane from Asahi Glass Company in Tokyo, Japan, the Neosepta ion exchange membrane from Tokuyama Polypro Limited Company in Tokyo, Japan, the Sybron Ionac® ion exchange membrane from Sybron Chemicals Inc. in Birmingham, N.J., and the R1010 ion exchange membrane from Pall Corporation in East Hills, N.Y.

Figure 5:
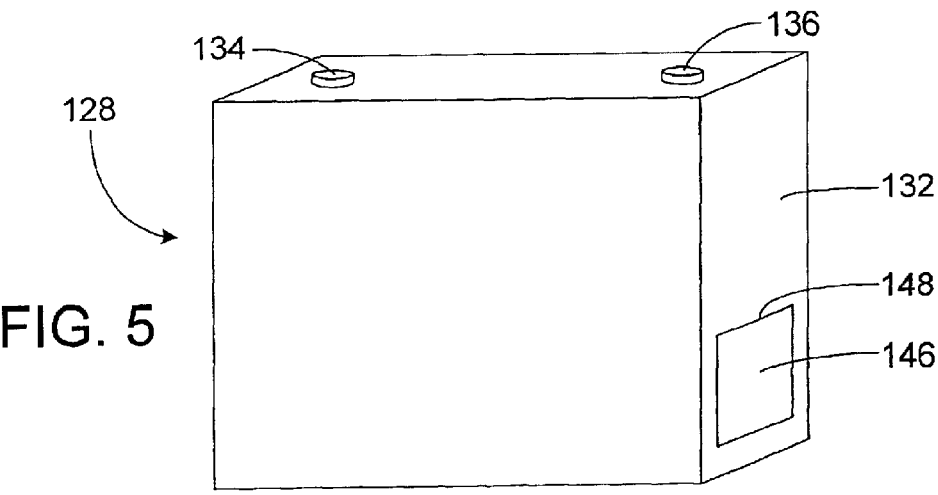
FIG. 5 is a perspective view of a battery in accordance with a preferred embodiment of a present invention.
Figure 6:
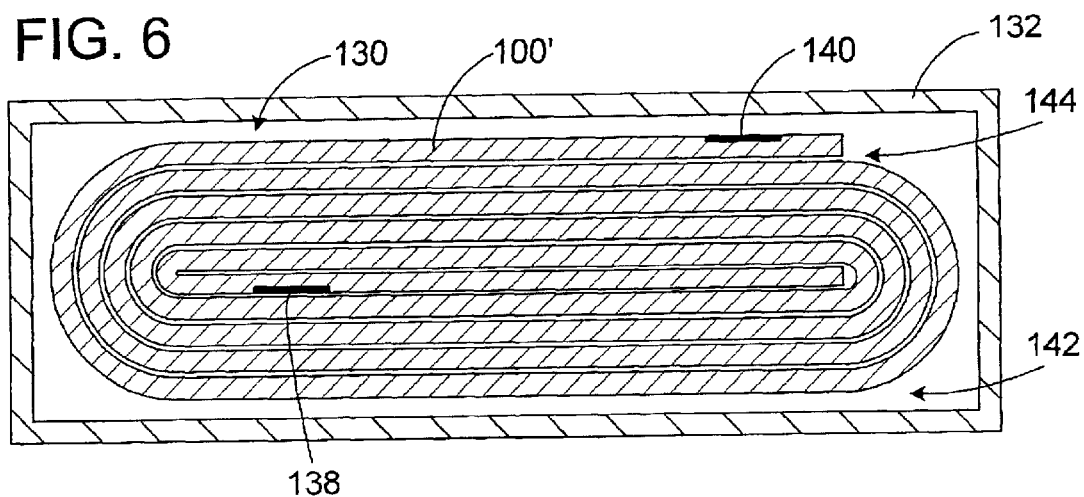
FIG. 6 is a section view of the battery illustrated in FIG. 5.

The exemplary electrochemical cell 100 has a wide variety of applications. One such application is a battery. As illustrated for example in FIGS. 5–7, an exemplary battery 128 includes a rolled structure 130 that consists essentially of a suitably sized electrochemical cell 100', a housing 132, a pair of contacts 134 and 136, and pair of connectors 138 and 140 that connect the anode and cathode collectors 114 and 120 to the contacts. The exemplary rolled structure 130 is rolled such that the cathode 104 is on the exterior and faces an open area 142 within the housing 132. There is also a small space 144 (typically between about 1 mm and about 10 mm) between adjacent layers of the rolled structure 130. In the illustrated implementation, ambient air reaches the open area 142 and small space 144 by way of a gas permeable, liquid impermeable membrane 146 that fills an opening 148 in the housing 132. Alternatively, in those implementations where the rolled structure 130 is rolled such that the cathode 104 is on the interior and faces away from the open area 142, the housing 132 or host device that is being powered by the battery 128 may be provided with a forced air apparatus such as a fan to provide adequate air circulation. The housing 132 may be formed from materials such as plexiglas or high density polyethylene. Preferred materials for the contacts 134 and 136 include copper or gold plated nickel electrode mesh.

The electrochemical cell 100' in the exemplary battery 128 stores the fuel 108 (preferably a borohydride fuel) in a porous pad 150. Suitable pad materials include rubber and polyethylene foam. Additional fuel may be stored in porous portions of the anode 102 and the ion exchange membrane 106. Once all of the fuel 108 has been consumed, the exemplary battery 128 may be disposed of.

Although not limited to use with any particular host device, the exemplary battery 128 may, for example, be used in conjunction with portable devices such as laptop and palmtop computers, cell phones and internet appliances. Approximately 5 ml to 500 ml of borohydride fuel will be stored such a battery, with the specific volumes depending on the requirements of the host device. The size and shape of the housing 132 may be varied based on the configuration of the host device. An implementation of the battery 128 for use in a laptop computer, for example, will be about 1 cm to 2 cm× about 4 cm to 5 cm× about 6 cm to 8 cm. Additionally, although the exemplary battery housing 132 is rectangular in cross-section, housings of other shapes, such cylindrical housings, may also be employed.

Figure 8:
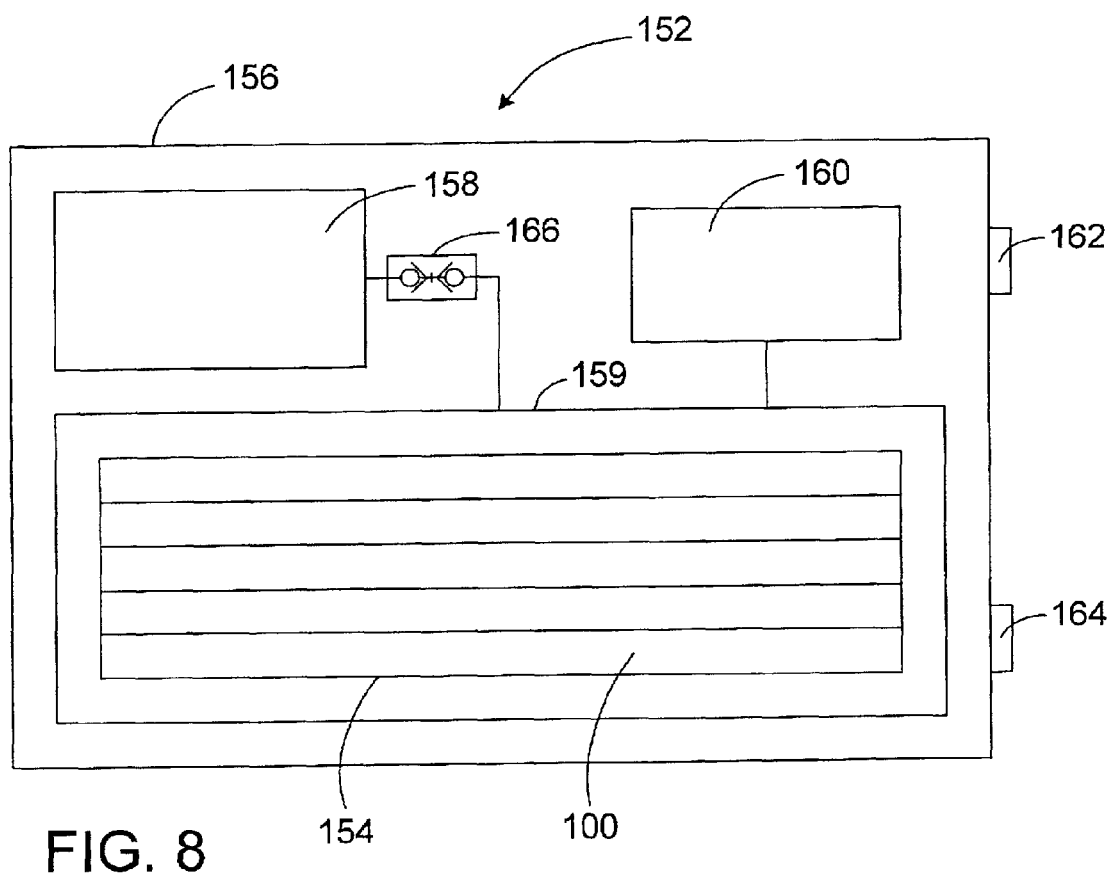
FIG. 8 is a diagrammatic view of a fuel cell in accordance with a preferred embodiment of a present invention.

Another application of electrochemical cells in accordance with the present inventions is fuel cells. As illustrated for example in FIG. 8, a fuel cell system 152 in accordance with one embodiment of a present invention includes a stack 154, with one or more electrochemical cells 100 connected in series, that is located within a housing 156. Fuel (preferably borohydride fuel) from a reservoir 158 is supplied to the anodes of the electrochemical cells by way of a manifold arrangement 159. A pump may also be provided if necessary. Air may be supplied to the stack 154 by drawing air through a vent (not shown) that is formed in the housing 156. An optional fan 160 may also provided, either within the housing 156 or within the host device, for this purpose. The exemplary fuel cell system 152 is also provided with a pair of contacts 162 and 164 that are respectively connected to the anode series and cathode series. Preferred materials for the contacts 162 and 164 include copper or gold plated nickel electrode mesh.

There are a variety of methods of refueling the exemplary fuel cell system. In the illustrated embodiment, the reservoir 158 is in the form of a removable cartridge that mates with a connector 166 when the cartridge is inserted into the housing 156. Alternatively, the reservoir may be fixed in place and simply refilled as necessary. Another alternative is too provide removable/replaceable fuel pads that can be inserted between the anodes and cathodes of the respective electrochemical cells.

The exemplary fuel cell system 152 is not limited to use with any particular host device. Nevertheless, like the exemplary battery 128, the exemplary fuel cell system 152 is well suited for use with portable devices such as laptop and palmtop computers, cell phones and internet appliances. As such, approximately 1 ml to 500 ml of borohydride fuel will be stored in the reservoir 158, with the specific volumes depending on the requirements of the host device. The size and shape of the housing 156 may be varied based on the configuration of the host device. An implementation of the fuel cell system 152 for use in a laptop computer, for example, will be about 1 cm to 2 cm× about 4 cm to 5 cm× about 6 cm to 8 cm.

Electrochemical cells in accordance with the present inventions may also be used to measure the concentration (or "level") of fuels, such as borohydride fuels, that are carried in solution in devices such as hydrogen generators and electrochemical cells (i.e. batteries and fuel cells) used to power host devices. As illustrated for example in FIGS. 9 and 10, a fuel level indicator 168 in accordance with one embodiment of a present invention is incorporated into a battery 170 that includes a housing 172, a fuel reservoir 174, an electrochemical cell stack 176 which receives fuel from the reservoir and oxygen from ambient air that enters the housing by way of a vent, and a pair of contacts 178 and 180 that connect the stack to the host device. The electrochemical cell stack 176 may be any suitable stack, including a stack of one or more of the electrochemical cells 100 described above. The exemplary fuel level indicator 168 includes an anode 182, a cathode 184, and a display 186. A depressible switch 188, which is biased to the open position, may also be provided so that the fuel level indicator 168 will remain inactive until the user desires a fuel level measurement. Alternatively, the switch 188 may be eliminated so that an "always on" indicator is provided.

The exemplary anode 182, which is positioned within the fuel reservoir 174, is preferably a stainless steel anode in those instances where the fuel stored in the reservoir is a borohydride fuel. Alternatively, the stainless steel anode 182 may be located outside of, but in fluid communication with, the fuel reservoir 174. In the illustrated embodiment, the anode 182 is a MEA similar to that described above with reference to FIG. 2. The exemplary cathode 184, which is preferably formed from a transition metal oxide such as silver oxide, platinum oxide or gold oxide, may be positioned within the housing 172 such that it will be exposed to air. In the illustrated embodiment, the cathode 184 is a MEA similar to that describe above with reference to FIG. 3. The primary difference between anodes and cathodes in the fuel level indicator 168 and the electrochemical cell 100 will typically be the size of the anodes and cathodes and the amount of fuel consumed. The fuel level indicator 168 should, of course, be relatively small as compared to the associated hydrogen generator or electrochemical cells and only consume the small amount of fuel required to power to the display 186.

Figure 9:
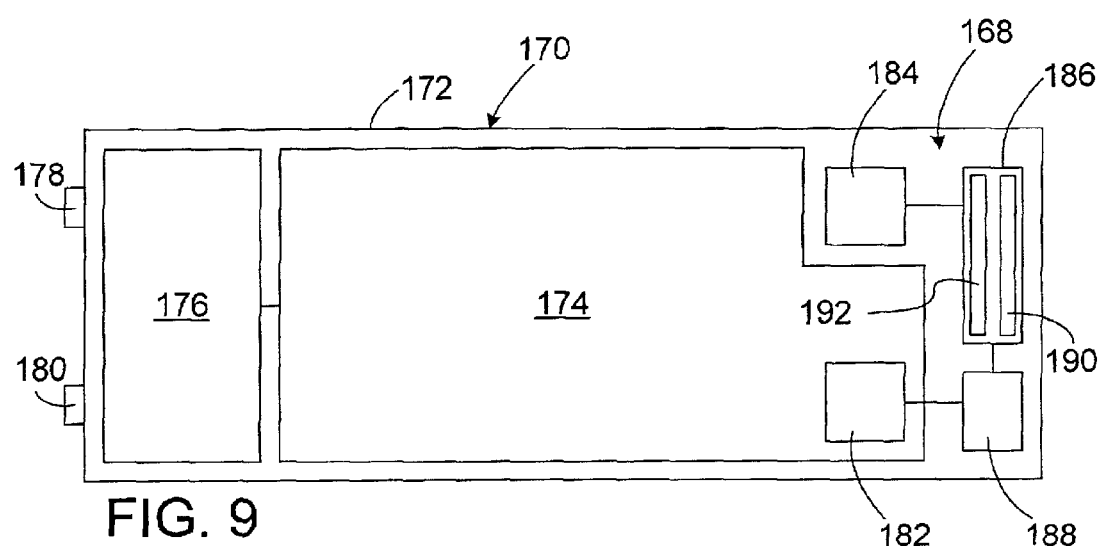
FIG. 9 is a diagrammatic view of a battery including a fuel level indicator in accordance with a preferred embodiment of a present invention.
Figure 10:
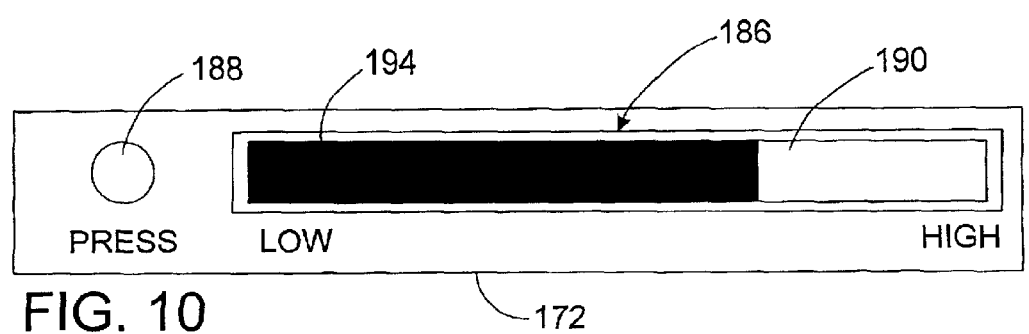
FIG. 10 is an end view of the battery illustrated in FIG. 9.

Although the present inventions are not limited to any particular display, the exemplary display 186 illustrated in FIGS. 9 and 10 is a liquid crystal display ("LCD") apparatus that includes an LCD strip 190 and the associated circuitry 192. The LCD strip 190 displays a bar 194 in response to activity at the anode 182 and cathode 184. Depending on the type of circuitry 192 that is employed, the length of the bar 194 will be related to the power, current or voltage associated with the anode 182 and cathode 184 when fuel is being consumed by the fuel level indicator 168. The bar 194 will extend to the "high" end of the LCD strip 192 when the fuel concentration is the highest, and will recede to the "low" end of the strip as fuel concentration drops. One example of a suitable LCD display and circuit arrangement is illustrated in U.S. Pat. No. 6,307,605. Displays other than LCDs, such as electroluminescent displays and color indicators, may also be employed.

Figure 11:
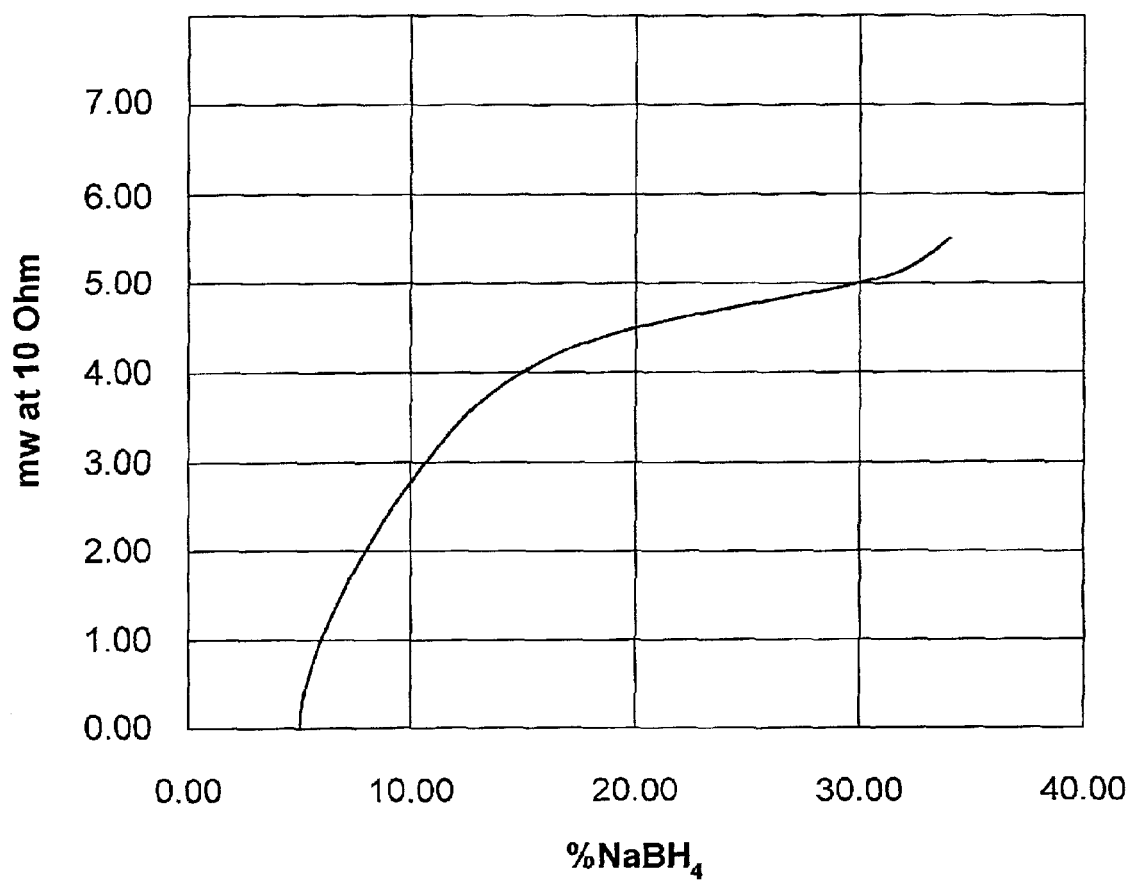
FIGS. 11 and 12 are graphs showing power versus sodium borohydride concentration.
Figure 12:
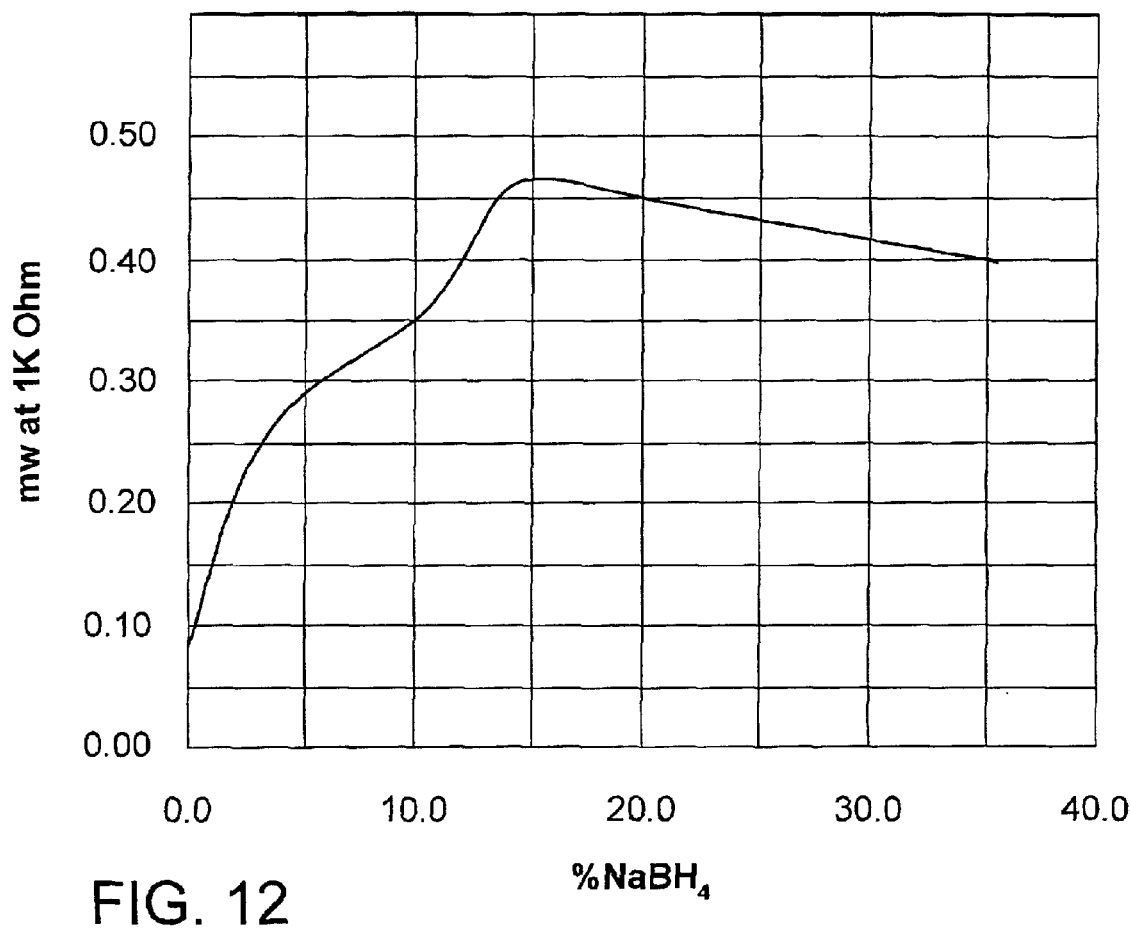

The relationship between power and the concentration of sodium borohydride in a 10% sodium hydroxide solution is graphically illustrated in FIGS. 11 and 12. The data displayed in FIGS. 11 and 12 was derived from an exemplary electrochemical cell which included a stainless steel anode, an AC65 silver MEA cathode and approximately 8 ml of fuel. The electrochemical cell was circular, with a diameter of 2.5 cm, and the anode and cathode each had a surface area of 12 $cm^2$.

Figure 13:
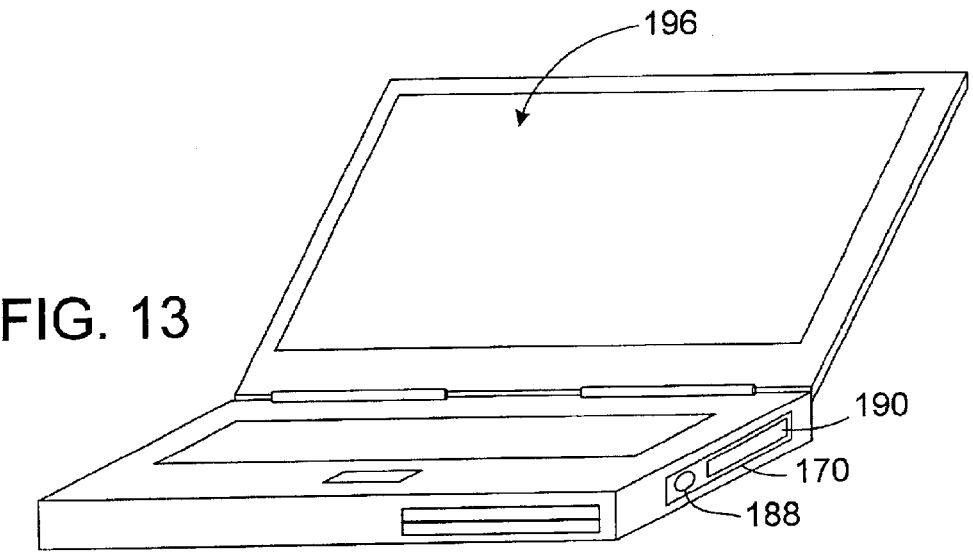
FIG. 13 is a perspective view of a notebook computer being used in conjunction with the battery illustrated FIGS. 9 and 10.

As illustrated for example in FIG. 13, one example of a host device that may be used in conjunction with the battery and fuel level indicator arrangement illustrated in FIGS. 9 and 10 is a notebook computer 196. The user will be able to determine the level of fuel remaining in the battery 170 by simply pressing the button 188. In those instances where the battery 170 is intended to be used with a specific host device (such a notebook computer), circuitry may also be provide which converts fuel level values into time values based on the average power consumption of the host device. These values may be displayed on the LCD strip 190 to indicate approximately how much longer the host device may be used before the fuel in the battery is completely consumed.

Figure 14:
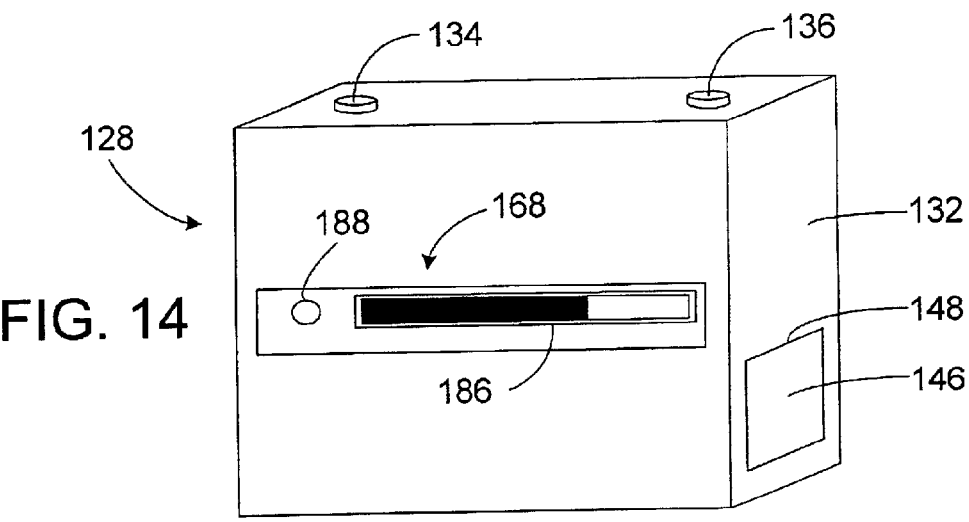
FIG. 14 is a perspective view of a battery in accordance with a preferred embodiment of the present invention.
Figure 15:
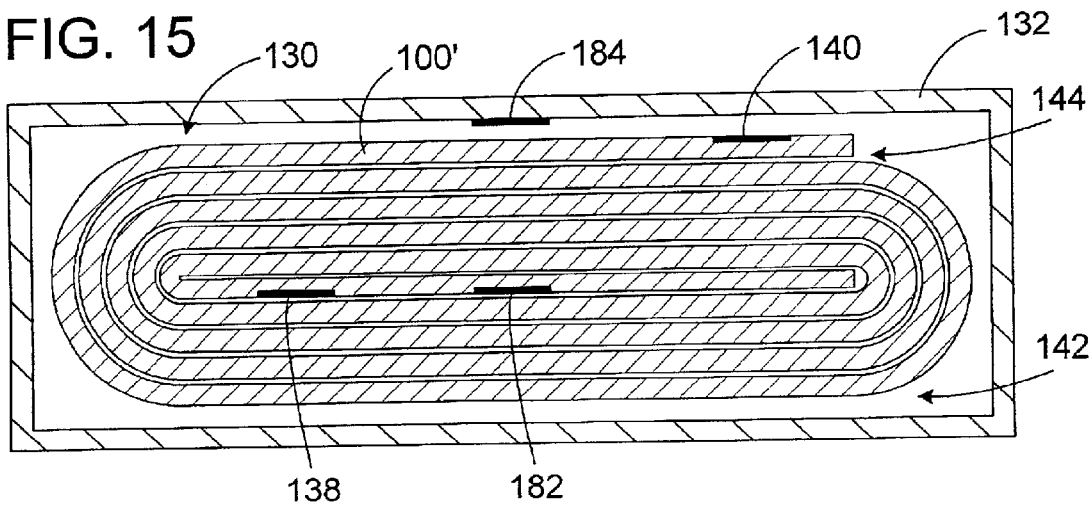
FIG. 15 is a section view of the battery illustrated in FIG. 14.
Figure 16:
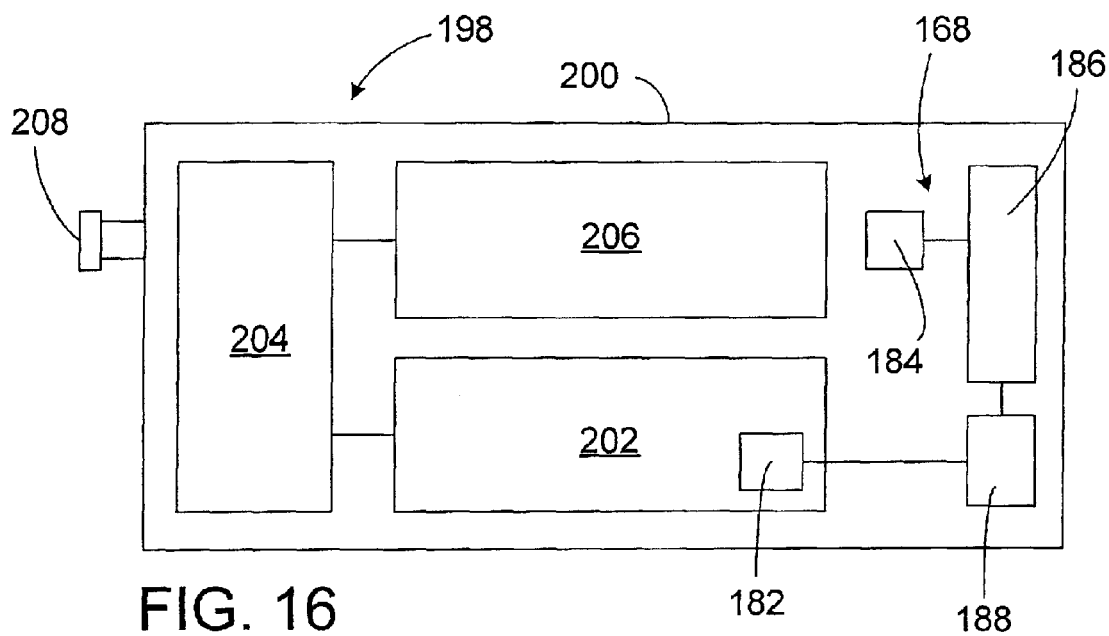
FIG. 16 is a diagrammatic view of an fuel cartridge in accordance with a preferred embodiment of a present invention.

The exemplary fuel level indicator 168 may be incorporated into a wide variety of fuel consuming devices in addition to the exemplary battery 170. As illustrated for example in FIGS. 14 and 15, the exemplary fuel level indicator 168 may be incorporated into the exemplary battery 128, which is described in detail above with reference to FIGS. 5–7. Here, the anode 182 is positioned within the porous fuel storage pad and the cathode 184 is positioned within the housing 132. Turning to FIG. 16, the exemplary fuel level indicator 168 may also be incorporated into a fuel cartridge 198 that is used in combination with a host device that has its own built-in fuel cell or other type of electrochemical cell. The exemplary fuel cartridge 198 includes a housing 200, a fuel reservoir 202 that stores a fuel (such as sodium borohydride in an aqueous solution), a reaction chamber 204 that stores a catalyst, and a bi-product reservoir 206 that stores the bi-product of the reaction that occurs within the reaction chamber. Such cartridges are sometimes referred to as "hydrogen generators." Hydrogen released from the fuel will exit the fuel cartridge 198 by way of an outlet connector 208, which also acts as a cap to prevent the release of hydrogen until it mates with the corresponding host device. In this implementation, the anode 182 is located within the fuel reservoir 202, while the cathode 184 preferably exposed to ambient air within the housing 200.

Figure 17:
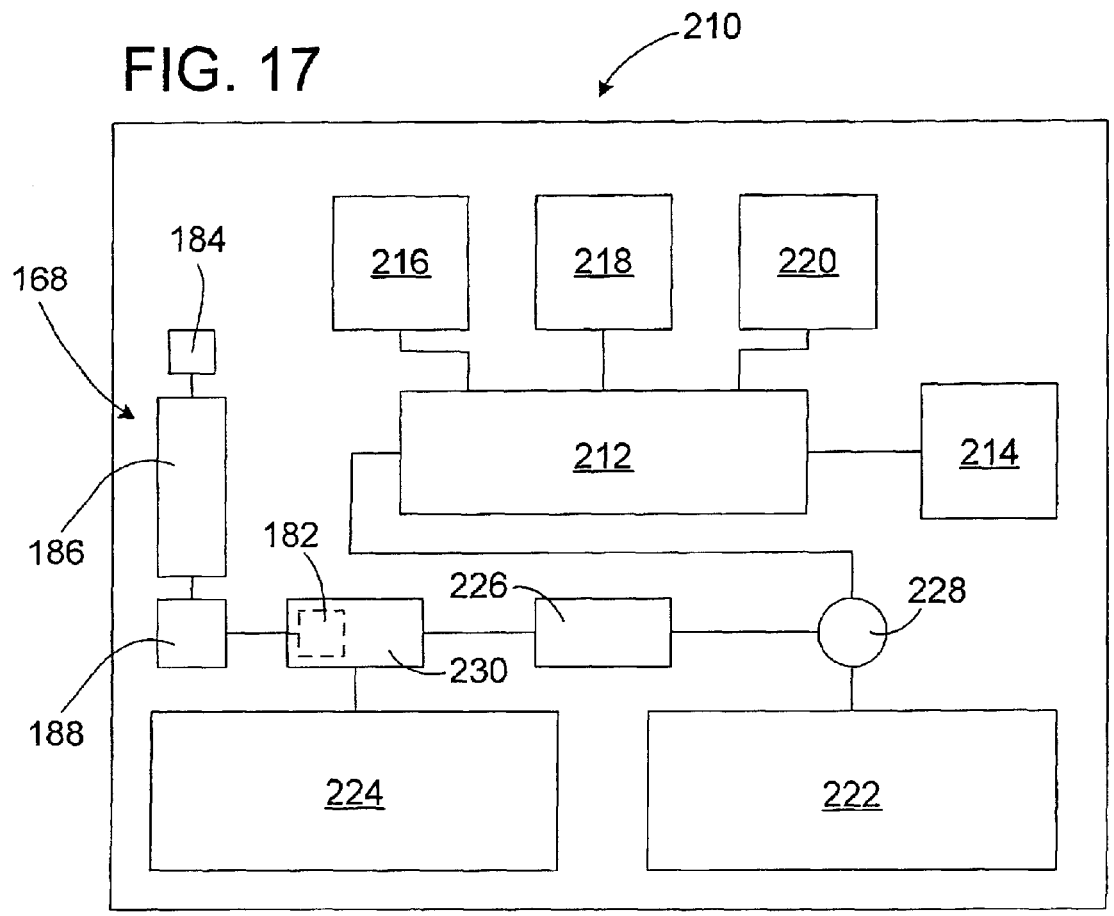
FIG. 17 is a diagrammatic view of a device in accordance with a preferred embodiment of a present invention.

The exemplary fuel level indicator 168, which is described in detail above, may be incorporated into the host device itself. As illustrated in FIG. 17, one example of a host device is a portable telephone 210, such as a cellular telephone. By way of example, but not limitation, other exemplary host devices include personal digital assistants, notebook computers, palmtop computers, calculators, digital cameras and music/video recording and playback devices. The exemplary portable telephone 210 includes a controller 212 (including a processor and memory), a communication device 214 (including circuitry and an antenna), a microphone 216, a speaker 218 and a display 220. The power consuming components of the exemplary portable telephone 210 are powered by an electrochemical cell 222, or a stack of cells, which receives a borohydride fuel from a fuel supply 224. The supply 224 may be a replaceable fuel cartridge or a refillable reservoir. Alternatively, if the host device is "disposable," the supply 224 may be a non-refillable reservoir. Fuel is pumped from the fuel supply 224, through a catalyst containing reaction chamber 226, to the electrochemical cell 222 by a pump 228 that is controlled by the controller 212. A small battery (not shown) may also be provided to provide power prior to the initial transfer of fuel to the electrochemical cell 222.

The exemplary portable telephone 210 is also provided with a small reservoir 230 through which the fuel passes on its way to the electrochemical cell 222. The fuel level indicator anode 182 is positioned within the reservoir 230. This allows the fuel concentration to be monitored in the manner described above. Alternatively, the anode 182 could be located within the fuel supply 224.

Although the present inventions have been described in terms of the preferred embodiments above, numerous modifications and/or additions to the above-described preferred embodiments would be readily apparent to one skilled in the art. It is intended that the scope of the present inventions extend to all such modifications and/or additions.

I claim:

1. A power generator, comprising:
   borohydride fuel; and
   a stainless steel anode associated with the borohydride fuel.
2. A power generator as claimed in claim 1, wherein the borohydride fuel is stored in a porous pad.
3. A power generator as claimed in claim 1, wherein the borohydride fuel is stored in a reservoir.
4. A power generator as claimed in claim 1, wherein the stainless steel anode includes at least one porous element.
5. A power generator as claimed in claim 1, further comprising:
   an ion exchange membrane.
6. A power generator, comprising:
   borohydride fuel; and
   a transition metal oxide cathode.
7. A power generator as claimed in claim 6, wherein the borohydride fuel is stored in a porous pad.
8. A power generator as claimed in claim 6, wherein the borohydride fuel is stored in a reservoir.
9. A power generator as claimed in claim 6, wherein the transition metal oxide cathode comprises at least one porous element.
10. A power generator as claimed in claim 6, further comprising:
    an ion exchange membrane.
11. A power generator, comprising:
    borohydride fuel;
    a stainless steel anode associated with the borohydride fuel; and
    a transition metal oxide cathode.
12. A power generator as claimed in claim 11, wherein the borohydride fuel is stored in a porous pad.
13. A power generator as claimed in claim 11, wherein the borohydride fuel is stored in a reservoir.
14. A power generator as claimed in claim 11, wherein the stainless steel anode includes at least one porous element.
15. A power generator as claimed in claim 11, further comprising:
    an ion exchange membrane between the stainless steel anode and the transition metal oxide cathode.
16. A power generator as claimed in claim 11, wherein the transition metal oxide cathode comprises at least one porous element.
17. A power generator as claimed in claim 11, wherein the transition metal oxide cathode comprises a silver oxide cathode.
18. A power generator as claimed in claim 11, wherein the power density of the power generator is greater than 300 Watt-hours per kilogram of the borohydride fuel.
19. A borohydride concentration indicator, comprising:
    a stainless steel anode;
    a cathode; and
    a display, operably connected to the stainless steel anode and to the cathode, adapted to provide a visible indication of the borohydride concentration.
20. A borohydride concentration indicator as claimed in claim 19, wherein the display is adapted to provide a visible indication of the borohydride concentration based on the voltage bias between the stainless steel anode and the cathode.
21. A borohydride concentration indicator as claimed in claim 19, wherein the display comprises a LCD.
22. A borohydride concentration indicator as claimed in claim 19, wherein the stainless steel anode includes at least one porous element.
23. A borohydride concentration indicator, comprising:
    an anode;
    a transition metal oxide cathode; and
    a display, operably connected to the anode and to the transition metal oxide cathode, adapted to provide a visible indication of the borohydride concentration.
24. A borohydride concentration indicator as claimed in claim 23, wherein the display is adapted to provide a visible indication of the borohydride concentration based on the voltage bias between the anode and the transition metal oxide cathode.
25. A borohydride concentration indicator as claimed in claim 23, wherein the display comprises a LCD.
26. A borohydride concentration indicator as claimed in claim 23, wherein the transition metal oxide cathode comprises at least one porous element.
27. A borohydride concentration indicator as claimed in claim 23, wherein the transition metal oxide cathode comprises a silver oxide cathode.
28. A borohydride concentration indicator, comprising:
    a stainless steel anode;
    a transition metal oxide cathode; and
    display means, operably connected to the stainless steel anode and to the transition metal oxide cathode, for providing a visible indication of the borohydride concentration.
29. An electrochemical device, comprising:
    a borohydride fuel storage device;
    an electrochemical cell associated with the borohydride fuel storage device; and
    a borohydride concentration indicator including
        an anode associated with the borohydride fuel storage device,
        a transition metal oxide cathode, and
        a display, operably connected to the anode and to the transition metal oxide cathode, adapted to provide a visible indication of the borohydride concentration of borohydride fuel in the borohydride fuel storage device.
30. An electrochemical device as claimed in claim 29, wherein the anode is located within the borohydride fuel storage device.
31. An electrochemical device, comprising:
    a borohydride fuel storage device;
    an electrochemical cell associated with the borohydride fuel storage device; and
    a borohydride concentration indicator including
        a stainless steel anode,
        a cathode, and
        a display, operably connected to the stainless steel anode and to the cathode, adapted to provide a visible indication of the borohydride concentration.
32. An electrochemical device as claimed in claim 31, wherein the anode is located within the borohydride fuel storage device.

33. A fuel cartridge, comprising:
a borohydride fuel storage device; and
a borohydride concentration indicator including
an anode associated with the borohydride fuel storage device,
a transition metal oxide cathode, and
a display, operably connected to the anode and to the transition metal oxide cathode, adapted to provide a visible indication of the borohydride concentration of borohydride fuel in the borohydride fuel storage device.

34. A fuel cartridge as claimed in claim 33, wherein the anode is located within the borohydride fuel storage device.

35. A fuel cartridge, comprising:
a borohydride fuel storage device; and
a borohydride concentration indicator including
a stainless steel anode,
a cathode, and
a display, operably connected to the stainless steel anode and to the cathode, adapted to provide a visible indication of the borohydride concentration.

36. A fuel cartridge as claimed in claim 35, wherein the anode is located within the borohydride fuel storage device.

37. A device, comprising:
a borohydride fuel storage device;
an electrochemical cell associated with the borohydride fuel storage device;
a power consuming device that is powered by the electrochemical cell; and
a borohydride concentration indicator including
an anode associated with the borohydride fuel storage device,
a transition metal oxide cathode, and
a display, operably connected to the anode and to the transition metal oxide cathode, adapted to provide a visible indication of the borohydride concentration of borohydride fuel in the borohydride fuel storage device.

38. A device as claimed in claim 37, wherein the anode is located within the borohydride fuel storage device.

39. A device, comprising:
a borohydride fuel storage device;
an electrochemical cell associated with the borohydride fuel storage device;
a power consuming device that is powered by the electrochemical cell; and
a borohydride concentration indicator including
a stainless steel anode,
a cathode, and
a display, operably connected to the stainless steel anode and to the cathode, adapted to provide a visible indication of the borohydride concentration.

40. A device as claimed in claim 39, wherein the anode is located within the borohydride fuel storage device.

41. A device, comprising:
a borohydride fuel storage device;
an electrochemical cell including
a stainless steel anode operably connected to the borohydride fuel storage device, and
a cathode; and
a power consuming device that is powered by the electrochemical cell.

42. A device as claimed in claim 41, wherein the stainless steel anode includes at least one porous element.

43. A device, comprising:
a borohydride fuel storage device;
an electrochemical cell including
an anode operably connected to the borohydride fuel storage device, and
transition metal oxide cathode; and
a power consuming device that is powered by the electrochemical cell.

44. A device as claimed in claim 43, wherein the transition metal oxide cathode comprises at least one porous element.

45. A power generator, comprising:
borohydride fuel; and
an anode and cathode arrangement that generates more than 300 Watt-hours per kilogram of the borohydride fuel.

46. A power generator as claimed in claim 45, wherein the anode and cathode arrangement that generates at least 450 Watt-hours per kilogram of the borohydride fuel.

47. A power generator as claimed in claim 45, wherein the anode and cathode arrangement that generates at least 600 Watt-hours per kilogram of the borohydride fuel.

48. A power generator as claimed in claim 45, wherein the anode and cathode arrangement that generates at least 1000 Watt-hours per kilogram of the borohydride fuel.

49. A power generator as claimed in claim 45, wherein the anode and cathode arrangement that generates at least 2000 Watt-hours per kilogram of the borohydride fuel.

50. A power generator, comprising:
borohydride fuel; and
generation means for generating more than 300 Watt-hours per kilogram of the borohydride fuel.

51. A power generator as claimed in claim 50, wherein the generation means generates at least 450 Watt-hours per kilogram of the borohydride fuel.

52. A power generator as claimed in claim 50, wherein the generation means generates at least 600 Watt-hours per kilogram of the borohydride fuel.

53. A power generator as claimed in claim 50, wherein the generation means generates at least 1000 Watt-hours per kilogram of the borohydride fuel.

54. A power generator as claimed in claim 50, wherein the generation means generates at least 2000 Watt-hours per kilogram of the borohydride fuel.

55. A power generator as claimed in claim 1, wherein the stainless steel anode includes a porous stainless steel current collector, a support layer and a catalyst layer between the porous stainless steel current collector and the support layer.

56. A device as claimed in claim 41, wherein the stainless steel anode includes a porous stainless steel current collector, a support layer and a catalyst layer between the porous stainless steel current collector and the support layer.

* * * * *